(12) United States Patent
Norman et al.

(10) Patent No.: US 10,660,426 B2
(45) Date of Patent: May 26, 2020

(54) ELECTRONIC DEVICE HARNESS ASSEMBLY

(71) Applicants: Robert Norman, Lansing, IL (US); Katrice Norman, Lansing, IL (US)

(72) Inventors: Robert Norman, Lansing, IL (US); Katrice Norman, Lansing, IL (US)

( * ) Notice: Subject to any disclaimer, the term of this patent is extended or adjusted under 35 U.S.C. 154(b) by 0 days.

(21) Appl. No.: 16/162,554

(22) Filed: Oct. 17, 2018

(65) Prior Publication Data

US 2020/0121065 A1    Apr. 23, 2020

(51) Int. Cl.
| A45F 5/00 | (2006.01) |
| F16M 13/04 | (2006.01) |
| A47B 23/00 | (2006.01) |
| A47B 23/02 | (2006.01) |

(52) U.S. Cl.
CPC ........ *A45F 5/00* (2013.01); *A45F 2200/0525* (2013.01); *A47B 23/02* (2013.01); *F16M 13/04* (2013.01)

(58) Field of Classification Search
CPC ... A45F 5/00; A45F 2200/0525; F16M 13/04; A47B 23/002
USPC .................................. 224/265, 270; 108/43
See application file for complete search history.

(56) References Cited

U.S. PATENT DOCUMENTS

| 2,603,134 | A | * | 7/1952 | Burnam | ................ | F16M 13/04 |
| | | | | | | 224/185 |
| 2,685,757 | A | * | 8/1954 | Mirigian | ................ | A47B 23/02 |
| | | | | | | 248/444 |
| 3,009,613 | A | * | 11/1961 | Noland | ................ | A47B 31/06 |
| | | | | | | 224/265 |
| 3,090,330 | A | * | 5/1963 | Best | ................ | A45F 5/00 |
| | | | | | | 108/43 |
| 3,541,976 | A | * | 11/1970 | Rozas | ................ | A47B 23/002 |
| | | | | | | 108/43 |
| 4,450,993 | A | * | 5/1984 | Ephraim | ................ | G10G 5/005 |
| | | | | | | 224/265 |
| 4,715,293 | A | * | 12/1987 | Cobbs | ................ | A47B 23/002 |
| | | | | | | 108/43 |
| 5,074,222 | A | * | 12/1991 | Welch | ................ | A47B 23/002 |
| | | | | | | 108/43 |
| 5,421,499 | A | * | 6/1995 | Bauer | ................ | A47B 23/002 |
| | | | | | | 108/43 |
| 5,941,436 | A | * | 8/1999 | Washington | ................ | A45C 15/00 |
| | | | | | | 224/259 |
| 6,006,970 | A | * | 12/1999 | Piatt | ................ | A45F 3/14 |
| | | | | | | 224/257 |
| D427,765 | S | * | 7/2000 | Porter | ................ | D12/406 |
| 7,051,910 | B2 | * | 5/2006 | Sprague | ................ | A45C 13/30 |
| | | | | | | 224/262 |
| D558,974 | S | | 1/2008 | Denzer | | |

(Continued)

FOREIGN PATENT DOCUMENTS

WO    WO2012151200    11/2012

*Primary Examiner* — Justin M Larson

(57) ABSTRACT

An electronic device harness assembly for facilitating hands-free use of an electronic device includes an electronic device that has a display. A harness is wearable over a user's shoulders a table is hingedly coupled to the harness. The table is positionable in a deployed position having the table being horizontally oriented. The electronic device is positionable on the table when the table is positioned in the deployed position. Thus, the display on the electronic device can be manipulated by the user when the user wears the harness.

6 Claims, 5 Drawing Sheets

(56) References Cited

U.S. PATENT DOCUMENTS

| | | | |
|---|---|---|---|
| 7,665,641 B2 * | 2/2010 | Kaufman | A45F 3/14 |
| | | | 224/261 |
| 7,778,026 B2 | 8/2010 | Mitchell | |
| 7,806,305 B1 * | 10/2010 | Moore, Jr. | A45F 5/00 |
| | | | 108/43 |
| 8,267,294 B2 * | 9/2012 | Yu | A45F 3/10 |
| | | | 224/623 |
| 8,418,629 B2 | 4/2013 | Yu | |
| 8,505,790 B2 * | 8/2013 | Yu | A45F 5/00 |
| | | | 224/185 |
| 8,807,406 B1 * | 8/2014 | Thach | A45F 5/00 |
| | | | 224/153 |
| 9,004,330 B2 * | 4/2015 | White | A45F 5/00 |
| | | | 224/256 |
| 9,433,279 B1 | 9/2016 | Kemper | |
| 9,856,895 B2 * | 1/2018 | Kieley | F16B 2/12 |
| 2006/0037987 A1 * | 2/2006 | Lin | A45C 5/00 |
| | | | 224/646 |
| 2006/0175365 A1 * | 8/2006 | Sandler | A45F 3/14 |
| | | | 224/201 |
| 2009/0272779 A1 | 11/2009 | Vu | |
| 2012/0175396 A1 * | 7/2012 | Patino | A45C 11/00 |
| | | | 224/627 |
| 2013/0214022 A1 | 8/2013 | Harvey | |
| 2015/0305479 A1 | 10/2015 | Sanchez | |
| 2019/0125062 A1 * | 5/2019 | Kippen | A45F 3/04 |

* cited by examiner

ELECTRONIC DEVICE HARNESS ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to harness devices and more particularly pertains to a new harness device for hands-free use of an electronic device.

BRIEF SUMMARY OF THE INVENTION

An embodiment of the disclosure meets the needs presented above by generally comprising an electronic device that has a display. A harness is wearable over a user's shoulders a table is hingedly coupled to the harness. The table is positionable in a deployed position having the table being horizontally oriented. The electronic device is positionable on the table when the table is positioned in the deployed position. Thus, the display on the electronic device can be manipulated by the user when the user wears the harness.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
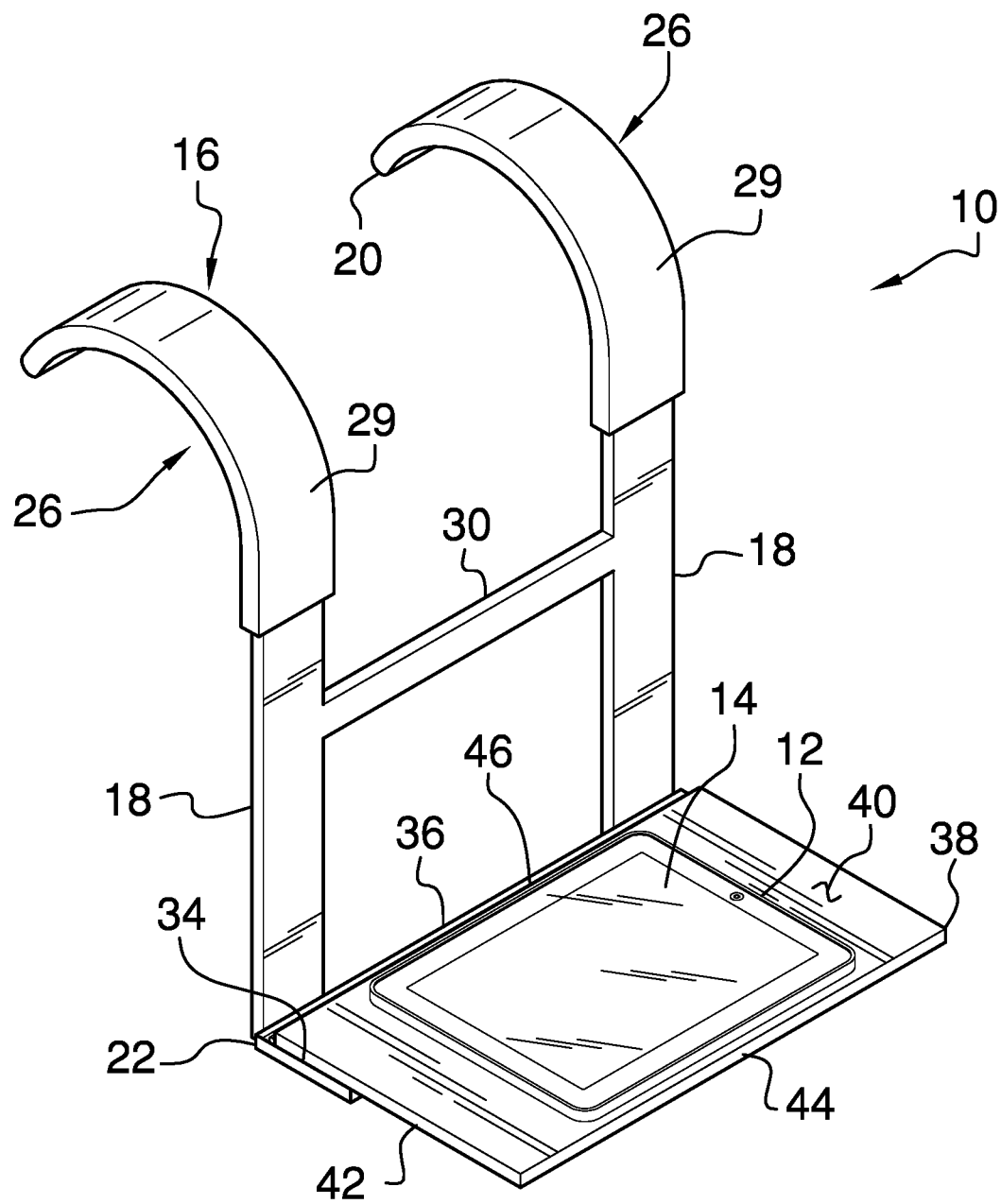
FIG. 1 is a top perspective view of an electronic device harness assembly according to an embodiment of the disclosure.
Figure 2:
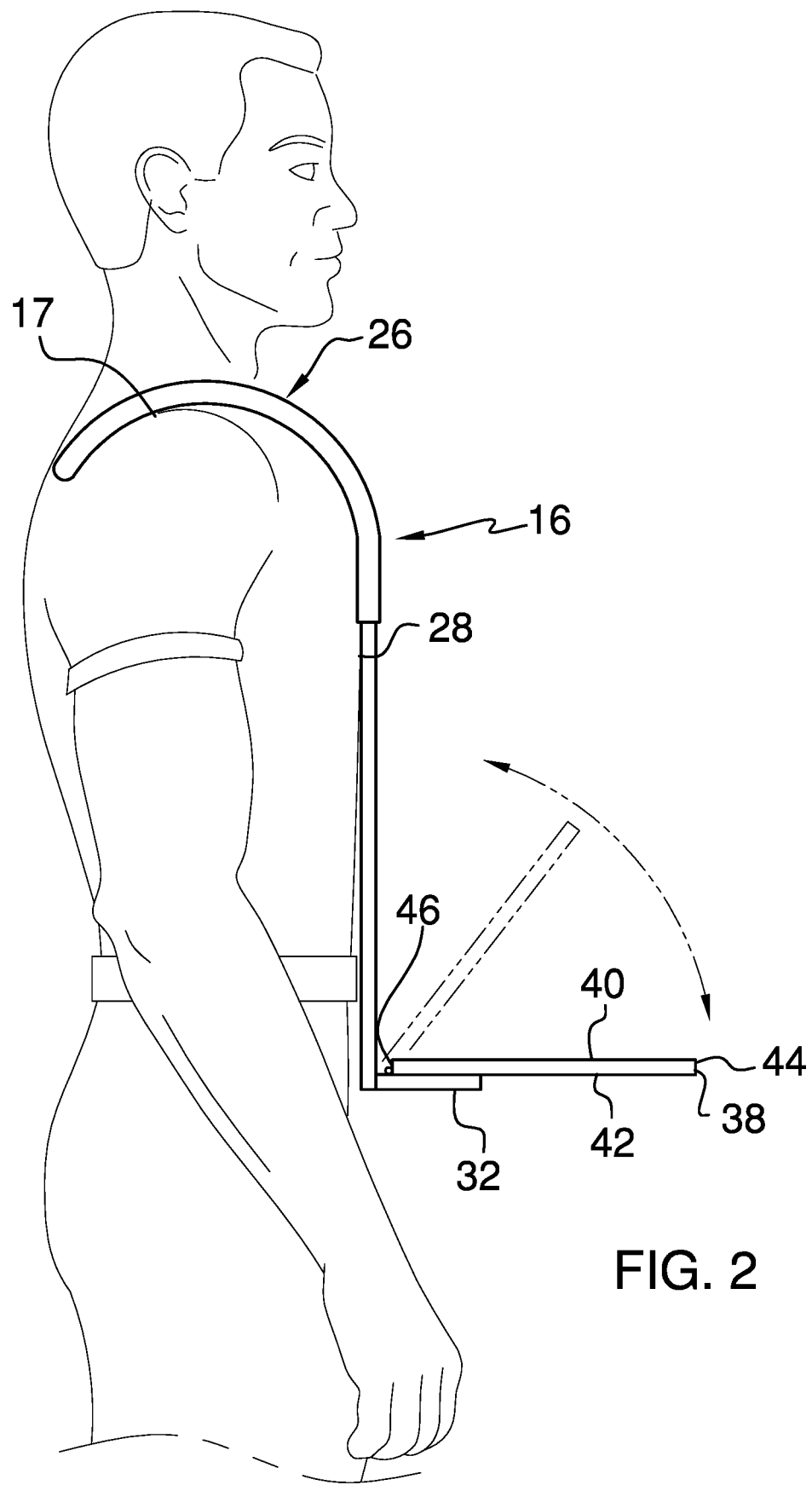
FIG. 2 is a perspective in-use view of an embodiment of the disclosure.
Figure 3:
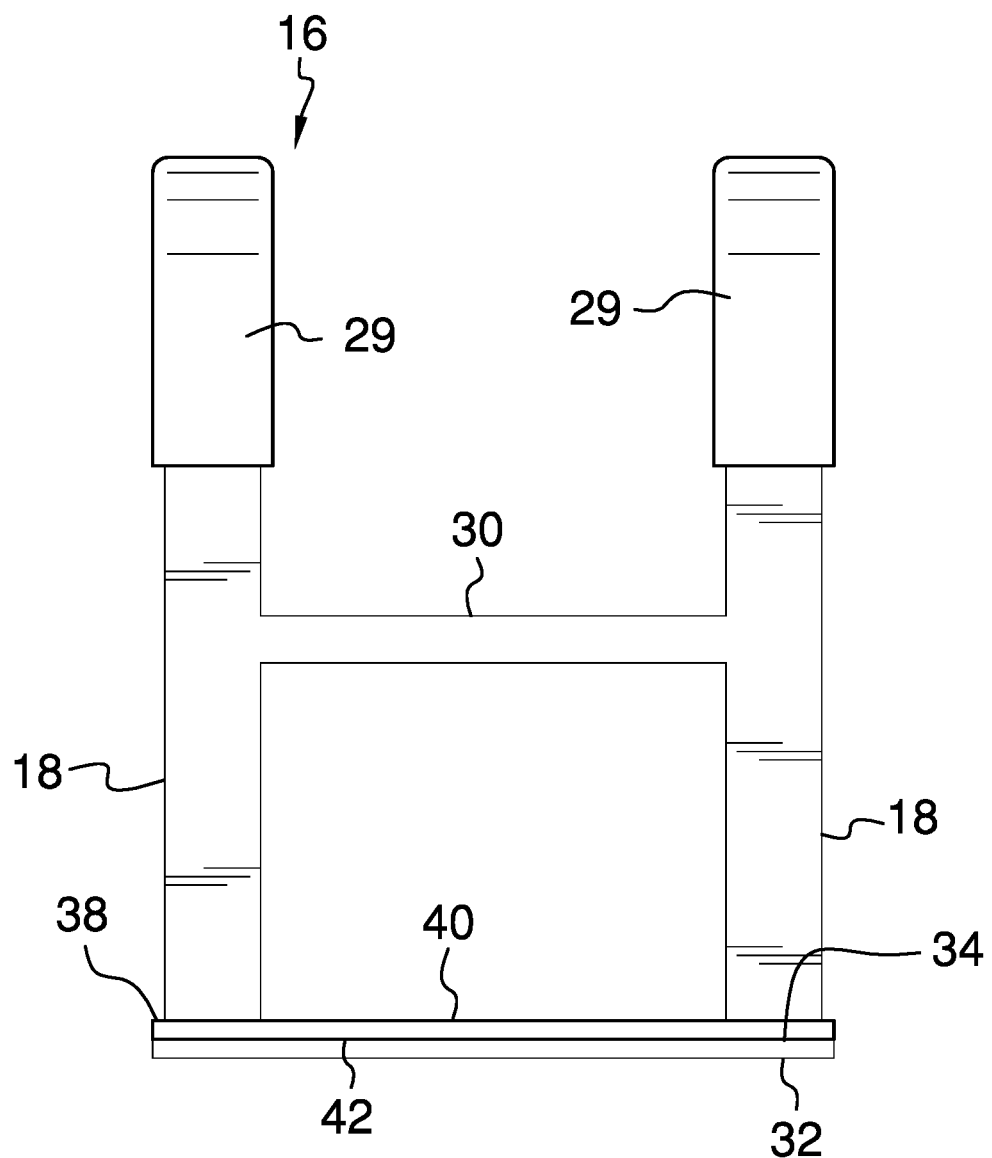
FIG. 3 is a front view of an embodiment of the disclosure.
Figure 4:
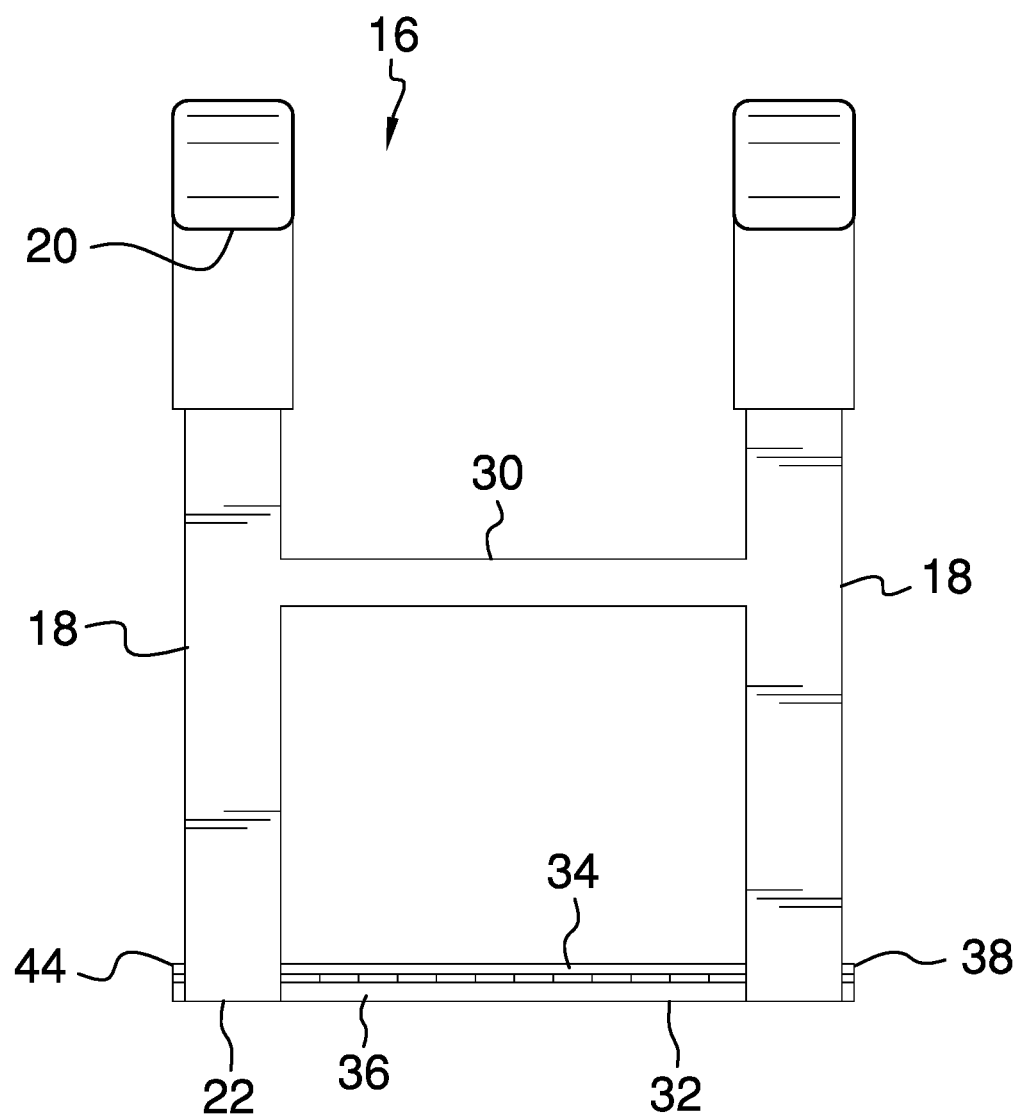
FIG. 4 is a back view of an embodiment of the disclosure.
Figure 5:
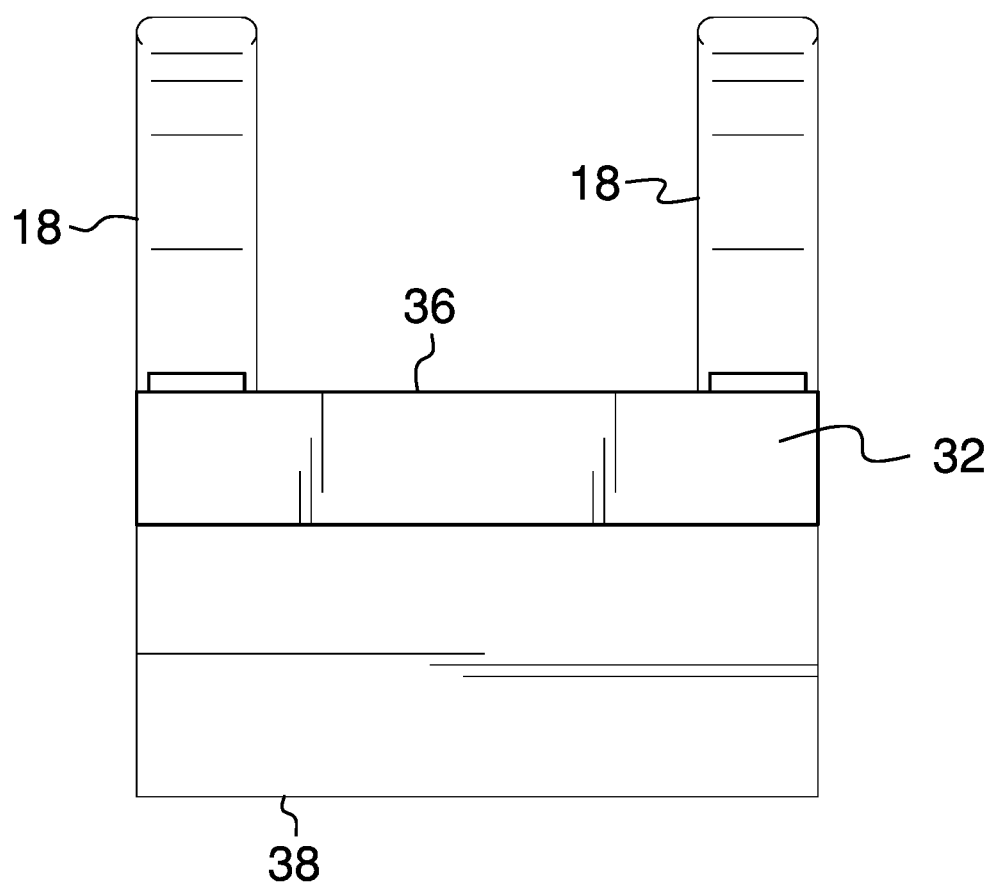
FIG. 5 is a bottom view of an embodiment of the disclosure.

With reference now to the drawings, and in particular to FIGS. 1 through 5 thereof, a new harness device embodying the principles and concepts of an embodiment of the disclosure and generally designated by the reference numeral 10 will be described.

As best illustrated in FIGS. 1 through 5, the electronic device harness assembly 10 generally comprises an electronic device 12 that has a display 14. The electronic device 12 may be a notebook computer, an I-pad or any other planar electronic device 12 and the display 14 may be an touch screen or other electronic display. A harness 16 is provided and the harness 16 is wearable over a user's shoulders 17. The harness 16 comprises a pair of shoulder members 18 that each has a first end 20, a second end 22 and a forward surface 24 extending therebetween.

Each of the shoulder members 18 has a bend 26 that is associated therewith. The bend 26 on the associated shoulder harness 16 is positioned between the first 20 and second 22 end of the associated shoulder harness 16. Thus, the first end 20 of each shoulder member 18 is directed downwardly toward the second end 22 such that each of the shoulder members 18 has a J-shape. In this way each of the shoulder members 18 extends downwardly along a user's torso 28 when the shoulder members 18 are worn over the user's shoulders 15.

A pair of cushions 29 is provided and each of the cushions 29 is positioned around a respective one of the shoulder members 18. Each of the cushions 29 extends from the first end 20 toward the second end 22 of the respective shoulder member 18 having the cushions 29 covering an entirety of the bend 26 on the respective shoulder member 18. Thus, each of the cushions 29 is positioned on the user's shoulders 17 when the harness 16 is worn. Each the cushions 29 is comprised of a resiliently compressible material thereby enhancing comfort for the user.

A support 30 is coupled between each of the shoulder members 18 such that the shoulder members 18 are spaced apart from each other. A panel 32 is provided that has a top surface 34 and a rear edge 36. The rear edge 36 is coupled to the forward surface 24 of each of the shoulder members 18 having the top surface 34 lying on a plane that is oriented perpendicular to the forward surface 24 of the shoulder members 18. A table 38 is hingedly coupled to the support 30 and the table 38 is positionable in a deployed position having the table 38 being horizontally oriented. The electronic device 12 is positionable on the table 38 when the table 38 is positioned in the deployed position. In this way the display 14 on the electronic device 12 can be manipulated by the user when the user wears the harness 16.

The table 38 has an upper surface 40, a lower surface 42 and a perimeter edge 44 extending therebetween. The perimeter edge 44 has a rear side 46 and the rear side 46 is hingedly coupled to the top surface 34 of the panel 32. The rear side 46 of the table 38 is spaced forwardly from an intersection between the rear edge 36 of the panel 32 and the forward surface 24 of the shoulder members 18. The lower surface 42 of the table 38 rests on the top surface 34 of the panel 32 when the table 38 is positioned in the deployed position. Additionally, the electronic device 12 is positioned on the top surface 34 of the table 38 when the table 38 is positioned in the deployed position. The upper surface 40 rests against the forward surface 24 of each of the shoulder members 18 when the table 38 is positioned in a stored position.

In use, each of the shoulder members 18 is worn on over the user's shoulders 17 and the table 38 is positioned in the deployed position. The the electronic device 12 can be positioned on the table 38 when the table 38 is positioned in the deployed position. Thus, the user can manipulate the display 14 on the electronic device 12 without holding the electronic device 12. In this way the user, who may be a supervisor in an industrial environment or the like, can employ the electronic device 12 in a hand's free manner with respect to supporting the electronic device 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An electronic device harness assembly being configured to be worn over a user's shoulders for supporting an electronic device, said assembly comprising:
   an electronic device having a display;
   a harness being wearable over a user's shoulders;
   a table being hingedly coupled to said harness, said table being positionable in a deployed position having said table being horizontally oriented, said electronic device being positionable on said table when said table is positioned in said deployed position wherein said display on said electronic device is configured to be manipulated by the user when the user wears said harness;
   wherein said harness comprises
   a pair of shoulder members, each of said shoulder members having a first end, a second end and a forward surface extending therebetween, and
   a panel having a top surface and a rear edge, said rear edge being coupled to said forward surface of each of said shoulder members having said top surface lying on a plane being oriented perpendicular to said forward surface of said shoulder members; and
   said table having an upper surface, a lower surface and a perimeter edge extending therebetween, said perimeter edge having a rear side, said rear side being hingedly coupled to said top surface of said panel, said rear side of said table being spaced forwardly from an intersection between said rear edge of said panel and said forward surface of said shoulder.

2. The assembly according to claim 1, further comprising each of said shoulder members having a bend being associated therewith, said bend on said associated shoulder harness being positioned between said first and second end of said associated shoulder harness having said first end being directed downwardly toward said second end such that each of said shoulder members has a J-shape wherein each of said shoulder members is configured to extend downwardly along a user's torso when said shoulder members are worn over the user's shoulders.

3. The assembly according to claim 2, wherein said harness comprises a support being coupled between each of said shoulder members such that said shoulder members are spaced apart from each other.

4. The assembly according to claim 1, wherein said lower surface of said table rests on said top surface of said panel when said table is positioned in said deployed position, said electronic device being positioned on said top surface of said table when said table is positioned in said deployed position, said upper surface resting against said forward surface of each of said shoulder members when said table is positioned in a stored position.

5. An electronic device harness assembly being configured to be worn over a user's shoulders for supporting an electronic device, said assembly comprising:
   an electronic device having a display;
   a harness being wearable over a user's shoulders;
   a table being hingedly coupled to said harness, said table being positionable in a deployed position having said table being horizontally oriented, said electronic device being positionable on said table when said table is positioned in said deployed position wherein said display on said electronic device is configured to be manipulated by the user when the user wears said harness;
   wherein said harness comprises
   a pair of shoulder members, each of said shoulder members having a first end, a second end and a forward surface extending therebetween, each of said shoulder members having a bend being associated therewith, said bend on said associated shoulder harness being positioned between said first and second end of said associated shoulder harness having said first end being directed downwardly toward said second end such that each of said shoulder members has a J-shape wherein each of said shoulder members is configured to extend downwardly along a user's torso when said shoulder members are worn over the user's shoulders,
   a support being coupled between each of said shoulder members such that said shoulder members are spaced apart from each other, and
   a panel having a top surface and a rear edge, said rear edge being coupled to said forward surface of each of said shoulder members having said top surface lying on a plane being oriented perpendicular to said forward surface of said shoulder members.

6. An electronic device harness assembly being configured to be worn over a user's shoulders for supporting an electronic device, said assembly comprising:
- an electronic device having a display;
- a harness being wearable over a user's shoulders, said harness comprising:
  - a pair of shoulder members, each of said shoulder members having a first end, a second end and a forward surface extending therebetween, each of said shoulder members having a bend being associated therewith, said bend on said associated shoulder harness being positioned between said first and second end of said associated shoulder harness having said first end being directed downwardly toward said second end such that each of said shoulder members has a J-shape wherein each of said shoulder members is configured to extend downwardly along a user's torso when said shoulder members are worn over the user's shoulders;
  - a support being coupled between each of said shoulder members such that said shoulder members are spaced apart from each other; and
  - a panel having a top surface and a rear edge, said rear edge being coupled to said forward surface of each of said shoulder members having said top surface lying on a plane being oriented perpendicular to said forward surface of said shoulder members; and
- a table being hingedly coupled to said harness, said table being positionable in a deployed position having said table being horizontally oriented, said electronic device being positionable on said table when said table is positioned in said deployed position wherein said display on said electronic device is configured to be manipulated by the user when the user wears said harness, said table having an upper surface, a lower surface and a perimeter edge extending therebetween, said perimeter edge having a rear side, said rear side being hingedly coupled to said top surface of said panel, said rear side of said table being spaced forwardly from an intersection between said rear edge of said panel and said forward surface of said shoulder members, lower surface of said table resting on said top surface of said panel when said table is positioned in said deployed position, said electronic device being positioned on said top surface of said table when said table is positioned in said deployed position, said upper surface resting against said forward surface of each of said shoulder members when said table is positioned in a stored position.

* * * * *